United States Patent [19]

Hasegawa

[11] 4,255,017
[45] Mar. 10, 1981

[54] TUNABLE SOURCE OF COHERENT ELECTROMAGNETIC RADIATION BASED ON MODULATIONAL INSTABILITY

[75] Inventor: Akira Hasegawa, New Providence, N.J.

[73] Assignee: Bell Telephone Laboratories, Incorporated, Murry Hill, N.J.

[21] Appl. No.: 103,449

[22] Filed: Dec. 14, 1979

[51] Int. Cl.$^3$ .......................... G02B 5/14; H02M 5/04
[52] U.S. Cl. .................................. 350/96.29; 307/425; 350/96.15
[58] Field of Search ............... 350/96.15, 96.29, 96.12, 350/96.14; 307/425

[56] References Cited

U.S. PATENT DOCUMENTS 4,095,122  6/1978  Damen et al. ........................ 307/425

OTHER PUBLICATIONS

K. O. Hill et al., "CW Three-Wave Mixing in Single-Mode Optical Fiber" in *J. Appl. Phys.*, vol. 49, No. 10, Oct. 1978.
R. Stolen et al., "Phase-Matched Three Wave Mixing in Silica Fiber Optical Waveguides", in *Appl. Phys. Letts.*, vol. 24, No. 7, Apr. 1974.
D. Knight et al., "Application of Nonlinear Devices to Optical Frequency Measurement", in *Jour. of Phys. E:Sci.-Instru.*, 1976, pp. 898-916.
A. Mooradian, "Tunable Lasers and Applications", *Proc. of Loen Conf. Norway*, 1976, Springer-Verlag, Berlin, 1976, pp. 60-80.
A. Hasegawa, "Plasma Instabilities and Nonlinear Effects", Springer-Verlag, New York, Berlin (1975), pp. 201-204.
A. Hasegawa et al., *Applied Physics Letts*, vol. 23 pp. 142-144, Aug. 1973.
J. Flemings, *Electronics Letters*, vol. 14, pp. 326-328, May 1978.
J. G. Small et al., *Applied Physics Letts.*, vol. 24, pp. 275-279, Mar. 1979.

*Primary Examiner*—Stewart J. Levy
*Attorney, Agent, or Firm*—Peter V. D. Wilde

[57] ABSTRACT

Method for achieving phase matching for electromagnetic radiation propagating through single mode transmission media, such as, for instance, single mode optical fiber. When coherent, monochromatic radiation of essentially constant amplitude, the carrier, is propagating through such a medium, and if the frequency of the carrier is chosen to be within a region of anomalous dispersion of the medium, then, provided the medium has a finite nonlinear coefficient of the index of refraction, the carrier wave is subject to a modulational instability. This instability results in the generation and exponential growth of sidebands, the two closest to the carrier frequency being the dominant ones. The modulation frequency is proportional to the square root of the power in the carrier wave. Apparatus for using the method is also disclosed, such as apparatus for using the method to tunably generate coherent radiation in the far infrared, apparatus for tunably generating coherent radiation relatively close to the carrier frequency, and apparatus for using the method for amplifying radiation at a frequency relatively close to the carrier frequency.

13 Claims, 6 Drawing Figures

TUNABLE SOURCE OF COHERENT ELECTROMAGNETIC RADIATION BASED ON MODULATIONAL INSTABILITY

BACKGROUND OF THE INVENTION

1. Field of the Invention

This invention pertains to the generation of radiant energy, more specifically, it describes a new mechanism for tunably generating coherent electromagnetic radiation.

2. Description of the Prior Art

Essentially monochromatic coherent electromagnetic radiation can be generated in several ways, of which probably the best known is by laser action. Another method is to mix coherent radiation in a nonlinear medium, thereby producing sum and difference frequencies, i.e., radiation at frequencies different from that of the input radiation. This disclosure is primarily concerned with this latter process, and I will refer to it as "photon mixing." Since photon mixing is most easily described in a particle picture, I will in the first part of the disclosure talk in terms of photons, their energy, and their momentum. As is well known, photon energy is proportional to frequency $\nu$, and photon momentum is related to wave number k.

As in all physical processes, in photon mixing both energy and total momentum have to be conserved. In a four-photon process, this means that $$\nu_1 + \nu_2 = \nu_3 + \nu_4, \text{ and}$$

$$k_1 + k_2 = k_3 + k_4 + \Delta k$$

where the subscripts 1 and 2 refer to the initial photons, 3 and 4 to the final ones, and $\Delta k$ is the photon momentum exchanged with the mixing medium. For efficient mixing, i.e., for efficient generation of radiation at the desired new frequencies $\nu_3$ and $\nu_4$, one needs $\Delta k = 0$. In bulk material, this condition can generally not be achieved, since $\Delta k > 0$ because of dispersion. Also, in a single-mode solid transmission medium strict conservation is normally not possible. However, K. O. Hill et al., *Journal of Applied Physics*, 49, page 5098 (1978), have achieved mixing in single mode optical fiber for $\nu_1 \approx \nu_2 \approx \nu_3 \approx \nu_4$, i.e., very small frequency separations. In the case of a multimode transmission medium, such as multimode optical fibers, strict momentum conservation is possible if the light to be mixed is launched into appropriately selected fiber modes since the wave numbers of higher-order modes are smaller than those of lower-order modes. This fact was used by R. H. Stolen et al., *Applied Physics Letters*, Vol. 24, page 308 (1974), to achieve four-photon mixing in silica-based fiber optical waveguides. In both these cases the work was done in the visible region, i.e., in a region of normal dispersion of the fibers used.

Recently it has been recognized that, if propagating in a nonlinear medium, a continuous train of electromagnetic waves is subject to a modulational instability. See for instance A. Hasegawa, *Plasma Instabilities and Nonlinear Effects*, Springer-Verlag, New York, 1975, page 201. It can be shown that this phenomenon is analogous to photon mixing as outlined above, and it is this modulational instability that is exploited by my invention.

One way of using photon mixing is in the generation of monochromatic electromagnetic radiation at frequencies relatively close to the frequency of the radiation source. Another possibility is to use the effect to generate electromagnetic radiation at a relatively lower frequency, by extracting the difference-frequency between, e.g., $\nu_3$ and $\nu_1$. The former was practiced, for instance, by K. O. Hill, et al., and by R. H. Stolen, et al., as mentioned above. The latter possibility has typically been used for purposes of frequency measurements only. See, for instance, the review paper by D. J. E. Knight and P. T. Woods, *Journal of Physics* E, Vol. 9, page 898 (1976).

The invention to be disclosed here can be used to generate coherent radiation at infrared frequencies, in particular, in the far infrared. That spectral region is one in which there still exists a pronounced need for convenient narrow-band tunable sources. Some tunable lasers exist that have their output in the near infrared, such as for instance the double-heterostructure $Pb_xSn_{1-x}Te$ diode laser, which has an output range from about 10 $\mu$m to about 15 $\mu$m, depending on the temperature of the laser. Another possibility of tunably generating electromagnetic radiation of infrared frequency is parametric oscillation, such as for instance in the $LiNbO_3$ parametric oscillator source, which has a wavelength range from about 1.4 to about 4 $\mu$m. For a review of tunable infrared lasers see for instance the article by A. Mooradian, and for a review of parametric oscillators the article by R. L. Byer, both in the *Proceedings of the Loen Conference*, Norway, 1976, editors A. Mooradian et al., Springer-Verlag, Berlin, 1976. Thus, tunable sources of coherent radiation exist for the near and middle ranges of the infrared, but they are relatively complex devices. But no convenient such sources appear to exist that have significant output in the far infrared. In view of this situation a simple tunable source of coherent infrared radiation that has a tuning range that includes the far infrared would clearly be of considerable interest.

SUMMARY OF THE INVENTION

In the following disclosure, I mean by "carrier wave" the essentially constant-amplitude, substantially coherent, electromagnetic wave, derived from an external source such as a laser, that has been coupled into a dispersive medium. "Sideband" will be used in its usual sense, and the frequency of the sideband differs from the carrier frequency by the "modulation frequency" $\nu_m$. Employing a frequently used definition, I mean by a "region of normal dispersion" of a transmission medium that frequency band wherein in the medium $\delta N/\delta\omega > 0$, with N being a specially defined index of refraction, namely the ratio of the speed of light in vacuum c to the group velocity $v_g$, and $\omega$ is the radial frequency. Similarly, in an "anomalous region" $\delta N/\delta\omega < 0$. I will also be using the terminology "group dispersion." This refers to the same basic phenomenon, but focuses on the group velocity $v_g = \delta\omega/\delta k$.

I am disclosing here a new method for achieving four-photon mixing in a single mode transmission medium, by selecting the frequency of the initial photons to lie in a region of anomalous dispersion of the medium. This method is applied to yield a new tunable source for coherent electromagnetic radiation that can be conveniently operated to have its output in the far infrared part of the spectrum. The method is also applied to the generation of coherent electromagnetic radiation at a frequency close to that of the carrier, with the frequency separation being simply tunable. And, as a related application of the method, a possible scheme for an amplifier for a frequency relatively near the carrier frequency is disclosed.

In the following discussion, I will generally speak in terms of waves, rather than in terms of photons. It can be shown that the two approaches lead, in the limiting case that restricts itself to the consideration of the dominant new frequencies only, to analogous results, since the two approaches are merely different ways of describing the same basic phenomenon of wave number matching. In the wave picture, then, the new radiation source utilizes the existence of the so-called "modulational instability" to shift energy from a carrier wave of frequency $v_0 = v_1 = v_2$, propagating through a single-mode dispersive medium, into sidebands, of which the two fundamental ones of frequencies $v_3$ and $v_4$ will be strongly dominant. The modulation frequency $v_m$, i.e., $|v_0-1\ v_3| = |v_0-v_4|$, is, as will be shown below, directly proportional to the square root of the power in the carrier wave. The proportionality factor is determined by the material properties of the propagation medium, such as its linear index of refraction, its nonlinear coefficient of the index of refraction, and its group dispersion, at the frequency of the carrier wave. The growth of the instability in the carrier is exponential, with the exponential factor depending on material properties of the medium, as well as the power in the carrier wave.

Stated differently, the invention teaches that a constant-amplitude, substantially coherent, monochromatic electromagnetic wave, propagating through a dispersive medium, will undergo amplitude modulation, with the modulation depth growing exponentially with time, provided the frequency of the carrier wave lies in a region of anomalous dispersion of the transmission medium. This amplitude modulation of course means that part of the energy in the carrier wave has been shifted into sidebands. This sideband energy can be extracted in standard ways - some possible methods for doing this will be discussed below. All that is required to use the instant invention for generating coherent radiation at a frequency different from the carrier frequency is, for instance, a source of substantially constant amplitude coherent radiation of the appropriate wavelength and intensity, standard optical single-mode fiber having low absorption in at least part of the region of anomalous dispersion, means for coupling the carrier wave into the fiber, and means for extracting the energy in the sidebands. The central idea is that, by employing a carrier having a wavelength in a region of anomalous dispersion of the transmission medium, exact phase matching is possible, resulting in efficient photon mixing. In other words, an instability in the carrier wave will develop and grow, at those sideband frequencies at which exact wave number conservation occurs, and these frequencies are a function of the carrier power.

As an example, for optical fiber consisting essentially of $SiO_2$ the appropriate carrier wavelength is greater than 1.3 $\mu$m, as will be shown in detail below. For a carrier of 1.4 $\mu$m wavelength and input power of 1 watt into a fiber having a cross-sectional area of $10\mu m^2$ the modulation has a wavelength of about $500\mu m$. The invention thus provides, inter alia, an extremely simple method for generating coherent far-infrared radiation that can be tuned over a wide frequency range by merely changing the carrier power.

DETAILED DESCRIPTION

Figure 1:
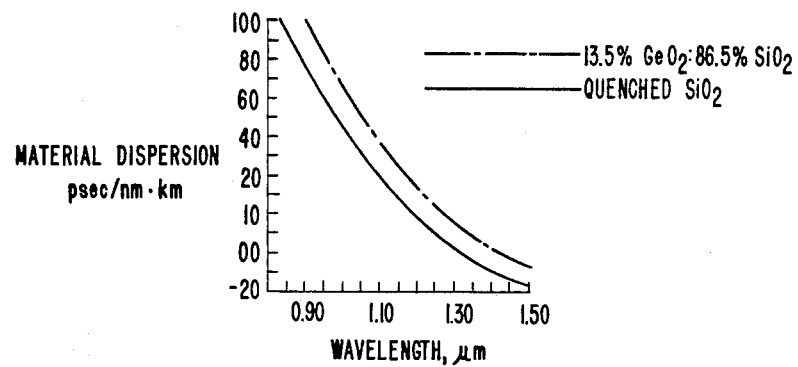
FIG. 1 shows plots of the material dispersion of two materials used in optical fibers, for wavelengths of interest in this application.

I will now outline the theory that predicts the existence and properties of modulational instability. For simplicity's sake, I will limit the discussion to the case of a plane wave carrier. However, it can be shown that the theory is equally applicable to guided waves, with the only change being the introduction of a scaling factor. Consider a carrier of form $$E(x,t) = \text{Re } \phi(x,t)\exp[i(k_o x - \omega_o t)], \quad (1)$$

where $\phi(x,t)$ represents the complex amplitude of the wave that is slowly varying due to the dispersive and non-linear properties of the transmission medium, and Re indicates the real part. All other symbols have their usual meaning, with $k_o$ and $\omega_o$ the wave number and radial frequency of the carrier. As usual, $\omega = 2\pi v$, where $v$ is the frequency. Assume that the dispersion property of the transmission medium can be represented by the expression $$ck/\omega = n_o(k,\omega) + n_2(k,\omega)|E|^2, \quad (2)$$

where $n_o$ is the linear refractive index, $n_2$ is the non-linear coefficient of the index of refraction, $|E|$ is the electric field of the wave and c is the speed of light in vacuum.

The wave number $k$ is thus a function of $\omega$ and $|E|^2$, and the function can be expanded in the usual way for $k$ near the carrier wave number $k_o$. Limiting the expansion to terms of second order, substituting the appropriate operators for the small quantities $k-k_o$ and $\omega-\omega_o$, and transforming the variables results in a nonlinear differential equation for $\phi$, the complex amplitude of the carrier wave. The solution of that equation depends on the sign of the group dispersion. Letting $\alpha = +\beta^2 k/\beta\omega^2$, one finds that for $\alpha > 0$, the equation has an exponentially growing solution, which, to first order, has a maximum spatial growth rate $$\gamma = n_2 k_o/n_o |\phi_o|^2 \quad (3)$$

which occurs at a "modulation" radial frequency $$\Omega_m = \left(\frac{2n_2 k_o}{n_o \alpha}\right)^{\frac{1}{2}} |\phi_o| \quad (4)$$

This result shows that for a carrier frequency in a region of anomalous dispersion of the transmission medium, the carrier wave will develop sidebands, with the sidebands at frequencies $\omega_o \pm \Omega_m$ having the largest exponential growth rate, with the e-folding distance given by $\gamma^{-1}$. In other words, the output of the transmission medium will contain, in addition to the carrier frequency, two sideband frequencies. The "lower" sideband is of form $$|E_o|e^{\gamma y}\cos[(k_o-\Omega_m/v_g)x-(\omega_o-\Omega_m)t]$$

and the "upper" one of form $$|E_o|e^{\gamma}\sin[(k_o=\Omega_m/v_g)x-(\omega_o=\Omega_m)t]$$

These results were derived for the plane wave case. It can be shown however that the same results hold true in the guided-wave situation if one multiplies the coefficient $\alpha$ by a reduction factor $\approx 0.5$.

Next I will relate the characteristics of the growing sidebands to the physical parameters of a transmission medium. The discussion will be in terms appropriate to silica ($SiO_2$) optical fiber, but of course any other transmission medium having low absorption in the anomalous dispersion region and showing a non-linear electric-field— dependence of the index of refraction could serve as well. In practice, for instance, the core of a single mode optical fiber would probably not consist of pure $SiO_2$ but perhaps of one of the $SiO_2$-based glasses that have a higher index of refraction than pure $SiO_2$. However, this would only slightly change the numbers involved, without introducing any fundamental change. Rearranging the above results one gets $$\left(\frac{v_m}{v_o}\right)^2 = \frac{|E_o|^2 n_2 k_o v_q}{2\pi n_o v_o}\left(\frac{\partial v_q}{\partial v}\frac{v}{v_g}\right)^{-1} \quad (5)$$

with $\alpha$ appropriately reduced for the guided wave case, and $2\pi v_o = \omega_o$, $2\pi v_m = \Omega_m$. Expressing the initial electric field strength of the carrier $|E_o|$ in terms of the input power P and the cross-sectional area of the fiber S, using, for the sake of example, appropriate values for the material parameters of $SiO_2$, i.e., $n_o = 1.5$, $n_2 = 3 \cdot 10^{-22}$ $(m/volt)^2$, and normalized group dispersion $\delta v_q/\delta v \, v/v_g = 1.3 \cdot 10^{-3}$, and assuming $\gamma_o = 1.4$ $\mu m$, as well as $S = 10\mu m^2$, one gets $$\lambda_m = \frac{5 \cdot 10^2}{\sqrt{P(watt)}} \mu m \quad (6)$$

Under the same conditions, the spatial growth rate is given by $$\gamma = 2.3 \cdot 10^{-2} \, P(watt) m^{-1}, \quad (7)$$

These results show that for a pump power of 1 watt, theory predicts an e-folding distance $\gamma^{-1}$ of about 43$\mu m$ and a modulation wavelength of about 500 $\mu m$.

Although the discussion so far has been in terms appropriate to monochromatic sidebands, it will be understood that the sidebands will have a relatively small but finite width, and that equations (5) and (6) refer to the center frequency and center wavelength of the sidebands, respectively. The finite width is due to various effects, among them nonlinearities in the transmission medium and fluctuations in the input power. The latter source of frequency broadening can of course be reduced by the use of an amplitude stabilized source.

Figure 2:
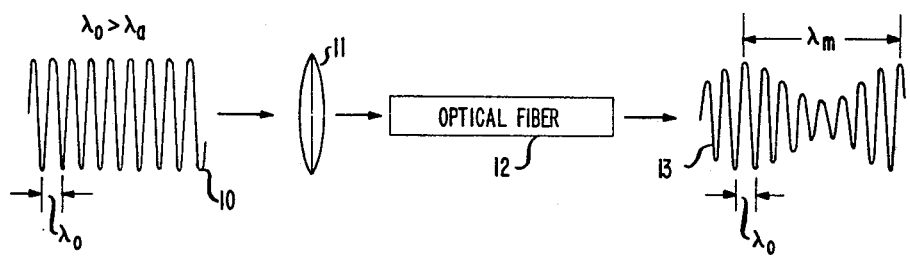
FIG. 2 is a schematic representation of the invention.
Figure 3:
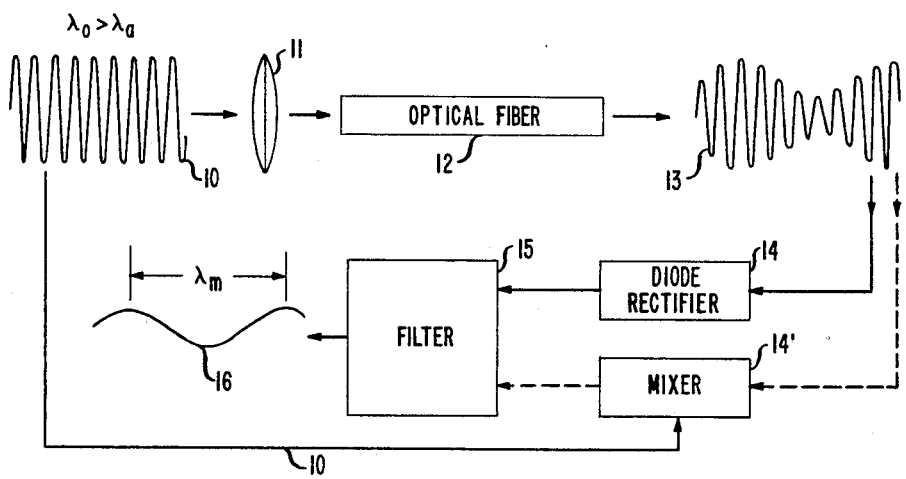
FIG. 3 shows, in the alternative, schematic representations of two possible ways of practicing the invention, i.e., of demodulating the modulated carrier wave.
Figure 4:
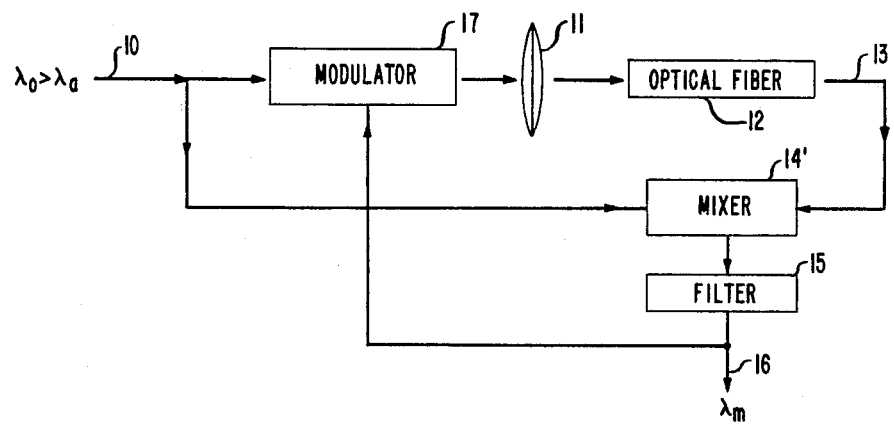
FIG. 4 is a schematic representation of another way of practicing the invention, by employing positive feedback.

FIG. 1 shows material dispersion as a function of wavelength, for two materials of interest in optical fibers. Material dispersion, i.e., $\gamma d^2 n/_{cd\gamma 2}$, is analogous to the group dispersion, $\delta v q/\delta v$, that appears in the above outlined theory. As can be seen from FIG. 1, material dispersion for $SiO_2$ is negative for wavelengths greater than about 1.3 $\mu m$. $\gamma_o > 1.3$ $\mu m$ thus corresponds to the regime where the parameter $\alpha > 0$ in silica fiber. Denoting by $\gamma_a$ the minimum wavelength of anomalous group dispersion then, in the general case, the necessary condition for the occurrence of a growing modulational instability is $\gamma_o > \gamma_a$, as is indicated in FIGS. 2-5. Of course, material dispersion becomes positive again for larger wavelengths, but these wavelengths are not of interest in the present discussion. FIG. 2 schematically shows the principle of the invention, as, for instance, practiced with silica-based optical fiber as the dispersive medium. The carrier 10, i.e., monochromatic unmodulated electromagnetic radiation of wavelength $\gamma_o$ greater than $\gamma_a$, after passing through optical system 11, enters the low loss single mode fiber 12 and, after passage through a finite length of fiber, will have undergone amplitude modulation. The output 13 of the optical fiber is thus the amplitude modulated carrier wave, with $\gamma_m$ the wavelength of the modulation. FIG. 3 shows, in the alternative, two simple possible ways for demodulating the amplitude modulated carrier wave. One possibility is to use a diode rectifier 14, preferably a thin film metal-insulator-metal (M-I-M) diode or other structure capable of rectifier action at the high frequencies of interest here. For a description of M-I-M diodes, see, for instance J. A. Small et al., *Applied Physics Letters*, Vol. 24, page 275 (1974). In the usual and well-known manner, such an arrangement results in a rectifier output at the, inter alia, envelope wavelength $\gamma_m$. The alternative possibility is to use optical mixer 14'. When mixing the modulated carrier with radiation at the carrier frequency the output of this device will also contain, inter alia, radiation at wavelength $\gamma_m$. This component can be separated with the aid of filter 15 from the components having other wavelengths, resulting in output radiation 16 of wavelength $\gamma_m$. For example, these schemes could be implemented by using a F-center laser operating at 1.6 $\mu m$. A possible optical fiber would be one with a $SiO_2$—$GeO_2$ core with low OH-content. Such fibers have been found to have a loss minimum at 1.6 $\mu m$. Proustite ($Ag_2AsS_3$) is a crystal that can possibly be used as a mixer. Since the output of a mixer increases with increasing pump power, it is advantageous to use as much pump power as possible. This might well be several hundred watts to a kilowatt or more, depending on the properties of mixer and laser. In practice, a beam splitting arrangement would probably be used to divide the output of the laser appropriately, perhaps in a ratio 1.1000, thus using one laser both as source of carrier and as local oscillator, i.e., source of the pump radiation, as is indicated in FIG. 3. FIG. 4 is another possible embodiment of the invention, which would result in more efficient generation of the desired electromagnetic radiation through the use of positive feedback. For definiteness, demodulation is shown to be by means of a mixer 14', but a diode rectifier would serve also. Part of the output of filter 15 is used, by means of modulator 17, to amplitude modulate the carrier wave before it is being coupled into the optical fiber, where the depth of modulation will be further increased due to the modulational instability. If filter 15 is chosen to be a narrowband device, such as, for instance, a Fabry-Perot filter, then the feedback loop could be expected to not only increase the depth of modulation, and thus the available output power, but also to narrow the bandwidth of the output.

Figure 5:
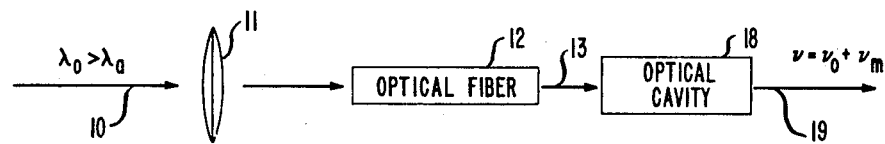
FIG. 5 is a schematic representation of a way to use the invention for the tunable generation of a frequency relatively close to the carrier frequency.

In FIG. 5 I schematically show a method for tunably generating coherent electromagnetic radiation at a frequency relatively close to the carrier frequency $\nu_o$. The amplitude modulated output 13 of optical fiber 12 is fed to an optical cavity 18 that is tuned to the desired frequency. It will thus have the effect of selecting out the radiation energy contained in one particular sideband. Since the frequency difference between carrier and sideband is proportional to the square-root of the carrier power, as was described above, this scheme presents a convenient method for obtaining coherent radiation at two adjacent frequencies, one of which can be tuned. Of course, the efficiency of generation could be improved by employing a feedback scheme, analogous to the scheme shown in FIG. 4.

Figure 6:
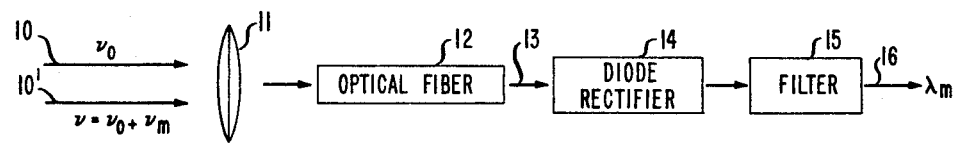
FIg. 6 is a schematic representation of still another way of practicing the invention, i.e., as an amplifier.

In the arrangement shown in FIG. 6, the input to optical fiber 12 consists of radiation at the carrier frequency $\nu_o$ and of a component at a frequency $\nu_o = \nu_s$, where $\nu_s$ is much smaller than $\nu_o$. By tuning the input power of the carrier such that the dominant modulation frequency $\nu_m$ (see equation 5) is identical to the frequency $\nu_s$, the arrangement can be made to act as an amplifier for the input component of that frequency.

Although I have disclosed here several means for using the invention, these are not meant to be limiting in any way, since one skilled in the art will easily find other applications for the here disclosed method of wavenumber matching. Also, even though the discussion has been given, for the sake of definiteness, in terms of single mode optical fiber, it will be understood that any other single mode waveguide or equivalent transmission medium will serve equally well, provided it has a region of such low loss as not to cause substantial absorption of the carrier wave, that it has anomalous group dispersion at the carrier frequency, and that it has a finite nonlinear index of refraction.

I claim:

1. A method for generating coherent electromagnetic radiation comprising:
   (a) coupling essentially constant amplitude, coherent electromagnetic radiation at a first frequency into a single mode transmission medium adapted to transmit radiation at the first frequency, the medium having at least one frequency region of anomalous dispersion, and
   (b) separating electromagnetic radiation at a second frequency different from the first frequency from the radiation after the radiation has propagated through the transmission medium,
   CHARACTERIZED IN THAT
   the carrier frequency is chosen to lie within the region of anomalous dispersion of the transmission medium, thereby achieving efficient generation of coherent electromagnetic radiation at least at the second frequency.

2. The method according to claim 1 wherein the single mode transmission medium is a waveguide containing $SiO_2$.

3. The method according to claim 1 wherein coherent electromagnetic radiation at a third frequency is coupled into the transmission medium, together with the radiation at the first frequency, with the third frequency being essentially the same as the second frequency.

4. Apparatus for generating at least two narrow bands of substantially coherent electromagnetic radiation having center frequencies $\nu_o \pm \nu_m$, comprising
   (a) a source for producing substantially monochromatic coherent electromagnetic radiation, the carrier wave, having substantially constant amplitude $|E_o|$, frequency $\nu_o$, and wave number $k_o$,
   (b) a single mode waveguide comprising material adapted to transmit radiation of frequency $\nu_o$, the material having at the frequency $\nu_o$ a linear refractive index $n_o$, and a nonlinear coefficient of the index of refraction $n_2$, the material having at least one region of anomalous dispersion, and
   (c) means for coupling the carrier into the waveguide, CHARACTERIZED IN THAT
   (d) the carrier frequency $\nu_o$ is chosen to lie within the at least one region of anomalous dispersion of the material of the waveguide, and
   (e) the input amplitude of the carrier $|E_o|$ is maintained so as to satisfy the relationship $$\left(\frac{\nu_m}{\nu_o}\right)^2 = \frac{|E_o|^2 n_2 k_o \nu_g}{2\pi n_o \nu_o}\left(\frac{\partial \nu_g \nu}{\partial \nu \nu_g}\right)^{-1}$$

wherein $\nu_g$ is the group velocity, $\delta\nu_g\nu/\delta\nu\nu_g$ is the normalized group dispersion, both evaluated at $\nu_o$, resulting in at least sidebands of frequency $\nu_o \pm \nu_m$.

5. Apparatus according to claim 4, further comprising means for separating at least partially the electromagnetic energy contained in at least one of the sidebands from the output of the waveguide.

6. Apparatus according to claim 4 wherein the carrier wave is derived from a laser.

7. Apparatus accordingg to claim 6 wherein the laser is amplitude stabilized.

8. Apparatus according to claim 4 wherein the waveguide substantially consists of optical fiber.

9. Apparatus according to claim 8 wherein the optical fiber contains $SiO_2$.

10. Apparatus according to claim 5 wherein the energy contained in at least one sideband is at least partially separated from the output of the waveguide by means of a diode rectifier and filters.

11. Apparatus according to claim 5 wherein the energy contained in at least one sideband is at least partially separated from the output of the waveguide by means of a mixer and filters.

12. Apparatus according to claim 4 wherein modulating means are used to modulate the carrier wave at the modulation frequency $\nu_m$ prior to coupling the modulated carrier wave into the waveguide.

13. Apparatus according to claim 5 wherein the energy contained in at least one of the sidebands is at least partially separated from the output of the waveguide by means of an optical cavity.

* * * * *